United States Patent Office 3,741,829
Patented June 26, 1973

3,741,829
HIGH-ENERGY PROPELLANTS WITH POLYMERIC FLUORO-AMINO BINDER AND HYDRAZINE DIPERCHLORATE
Edward A. Hunter, Westfield, and Adolf H. Muenker, Piscataway Township, Middlesex County, N.J., assignors to Esso Research and Engineering Company
No Drawing. Filed Feb. 28, 1963, Ser. No. 262,293
Int. Cl. C06d 5/06; C08g 22/00
U.S. Cl. 149—19                12 Claims This invention relates to the curing of poly(difluoramino ether) alcohols with an effective crosslinking polyisocyanate, preferably polyisocyanates containing 3 or more —NCO groups per molecule, as in polyphenyltriisocyanate compounds, for converting such polymers to rubbery polyurethanes of high tensile strength, even when said polymers are formulated with high proportions of liquid and solid oxidizing components in preparing a high-energy solid rocket propellant.

Although up until the discovery of the present invention a number of polyether alcohols having a high $NF_2$ content have been synthesized, there have been difficulties encountered in the curing of these polymers to high strength binders, and particularly to high strength binders when loaded with liquid and solid oxidizers. The high loading with liquid oxidizers, such as liquid organic compounds having a high proportion of $NF_2$ groups, and with oxygen oxidizers, such as those capable of supplying a high amount of oxygen, is important in the preparation of high-energy solid propellants that have a satisfactory high impulse (Isp) of above 270. In general, it is difficult to make the binders contain as much $NF_2$ as the lower molecular weight liquid oxidizers having $CNF_2$ groups or one or more of such high-energy groups attached per carbon atom in the molecule. For that reason, the proportion of binder used in a propellant system has to be limited to within the range of 5 to 30 wt. percent, and preferably as low as possible without sacrificing needed binding strength.

In accordance with the present invention, it has been discovered that the high-energy (high $NF_2$ content) polyether alcohols are better adapted for curing with polyisocyanates of the polyphenyltriisocyanate type, especially under conditions meeting requirements for high loading with liquid oxidizers of high $NF_2$ content and a solid oxidizer, particularly such as hydrazine diperchlorate. The conditions for curing are preferably an ambient or moderate temperature, e.g. in the range of about 20° to 100° C., for preventing undesired decomposition which would cause loss of oxidizing constituents and for preventing degraded functioning of the binder.

POLY(DIFLUORAMINO ETHER) ALCOHOLS FOR CROSSLINKING

A number of $NF_2$-containing polyether alcohols suitable for crosslinking into a higher molecular weight polyurethane have now been developed. These polyether alcohols are represented by the general recurring unit formula:

$$HO[-R(NF_2)_m-O-]_xH$$

wherein the recurring unit indicated within the bracket contains the substituted alkylene group R, of say 4 to 6 carbon atoms, in which each of $m$ carbon atoms, e.g. 2 to 4, has an attached $NF_2$ group. Said substituted alkylene group R generally contains a branched chain carbon atom and the $NF_2$ groups may be attached to the side branched chain carbon atoms and may also be attached to carbon atoms which are in the linear polyether chain. The polyether molecules have approximately 1 to 6 OH groups per molecule, but should have an average of 1.5 to 3 OH groups, preferably at least 2.

Typically representative poly(difluoramino ether) alcohols suitable for the purpose of the present invention for making the desired high-energy polyurethane binders are the following:

Polymers of 3 - difluoraminomethyl 3 - difluoramino oxetane having the recurring unit:

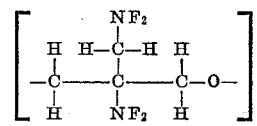

The polyether prepared from the $N_2F_4$ adduct of 3-methylene oxetane may have a molecular weight in the range of about 800 to 10,000 with the required terminal hydroxyl groups for crosslinking, has a high $NF_2$ content close to 60 wt. percent, and has high hydrolytic stability. Its preparation and characteristics are described in U.S. Ser. No. 239,103, filed Nov. 16, 1962 by Eugene L. Stogryn.

The polyether termed poly[4,5 - bis(difluoramino) pentene-1 oxide], given the abbreviation PPMOA, is represented by the recurring unit:

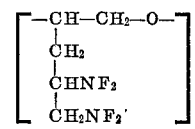

This kind of polymer has been formed by polymerization of 1,2-bis($NF_2$) 4,5-epoxy pentane using a Lewis acid catalyst, e.g. $PF_5$, as described in U.S. Ser. No. 168,015, filed Jan. 18, 1962 by Eugene L. Stogryn et al. and has been prepared advantageously by reacting the polymer poly(1,4-pentadiene monoxide) with $N_2F_4$, as described in U.S. Ser. No. 219,372, filed Aug. 22, 1962 by Anthony J. Passannante et al.

A polyether alcohol capable of higher $NF_2$ content is poly(1,2-divinyl ethylene oxide)-$N_2F_4$ adduct having the recurring unit:

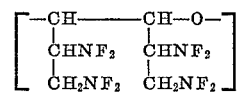

This is made by reacting poly(1,2-divinyl ethylene oxide) with $N_2F_4$ at about 60° to 150° C.

In general, as indicated, the energetic polyether alcohols, such as described, contain 4 to 6 carbon atoms in the $NF_2$-substituted hydrocarbon radical, 2 to 4 $NF_2$ groups being attached to carbon atoms; 4 to about 80 or more of the recurring units may be present in the polymer molecules having the terminal hydroxyl groups.

Although the higher molecular weight polyethers containing $NF_2$ groups can be used as solid binder components, studies have shown that for improved binding strength and tensile strength, such polymers should be modified by appropriate reactants which extend the polymer chain and which effect crosslinking of the polymer chains.

One approach to the problem of modifying the $NF_2$-containing polyether alcohols involves forming the unsaturated polyether alcohol by reaction of an unsaturated epoxide compound in the presence of a hydroxyl group-containing compound, such as water, glycidol, ethylene glycol, and trimethylolpropane. When the polymerization of the unsaturated monoxide or epoxide is carried out in the presence of a minor amount of such modifiers, e.g. up to about 10 mole percent based on the epoxide, such organic modifiers having 2 or more hydroxyl groups may copolymerize with the unsaturated epoxide reactant. The hydroxyl group containing modifiers may also act as a chain terminator and introduce terminal OH groups into the polymer molecule. In acting as chain terminators, the hydroxyl group-containing modifiers may tend to lower the molecular weight, although they serve to give the resulting polymers a relatively higher proportion of OH groups per molecule. At the same time, caution has to be used in the amount of substance added to the polymer chains which would decrease the energy value of the polymers.

Another approach to the problem of effecting chain extension and crosslinking of the polyether alcohols involves the reaction of the polyether alcohols with a diisocyanate, e.g. 2 moles of a diisocyanate per mole of the polyether alcohol having 2 hydroxyl groups, to give an extended polymer chain terminated with isocyanate groups. Such modified polyethers can then be cured by reaction with a polyhydric alcohol, e.g. trimethylolpropane, to give a crosslinked polyurethane. With this type of modification and curing, however, no measurable strength could be imparted to a formulation containing acceptable quantities of liquid oxidizer. A diisocyanate-trimethylolpropane cured formulation, for instance, consisting of 25% binder, 35% tetrakis($NF_2$) butane and 40% ammonium perchlorate or hydrazine diperchlorate, cured only to a muddy consistency incapable of holding the liquid oxidizer and, hence, not suited as a solid propellant. Furthermore, even if acceptable physical properties could be obtained with a diisocyanate-trimethylolpropane cure, this type of modification and curing involves extra handling and formulation steps and difficulties in proportioning the reactants. With the use of the additional steps of reaction, there are the additional hazards of handling the materials and chances of degrading the energy value of the polymer.

A striking advance has thus been made in successful curing of the $NF_2$-containing polyether alcohols by reaction with triisocyanates and higher polyisocyanates, i.e. isocyanates containing more than 2 NCO groups per molecule. For the sake of simplicity, the suitable polyisocyanates are herein termed triisocyanates in contrast to the conventional diisocyanate crosslinking agent.

TRIISOCYANATES FOR CROSSLINKING OF $NF_2$-CONTAINING ALCOHOLS

While there are known to be a number of triisocyanates described in the literature, suitable triisocyanates for the purpose of the present invention are those that have solubility in the $NF_2$-containing polyether alcohols. In this respect, the following typical triisocyanates or polyisocyanates are suitable.

Polymethylene polyphenyltriisocyanate containing on the average 3 or more phenylisocyanate groups interlinked by methylene groups, as in the formula:

$$OCN \cdot C_6H_3[(\cdot CH_2)C_6H_4NCO]_2$$

This polyisocyanate is commercially available in a composition which contains 1 gram-mole of NCO groups in about each 132 grams of the substance.

Triphenylmethane triisocyanate is commercially available in a composition containing 1 NCO group per about 138 grams. This material has an isocyanate group attached to each of the phenyl nuclei in a para position with respect to the carbon atom to which each of the phenyl groups is linked and which may be represented by the formula: [$OCN \cdot C_6H_4]_3 \cdot CH$.

Other suitable polyisocyanates for the crosslinking of the $NF_2$-containing polyether alcohols can be determined from the criteria set forth, and examples of such compounds are: poly(methylene phenylene diisocyanate) and poly(toluene diisocyanate) that has an average of more than 3 isocyanate groups per molecule. Polyisocyanates may also be made to contain $NF_2$ groups.

In order for the polyisocyanates to be used satisfactorily as the crosslinking agent with the $NF_2$-containing polyether alcohols, they should have sufficient solubility in the polyether alcohol or the solutions of the polyether alcohol in the liquid $CNF_2$ oxidizer which is used in the propellant formulation. As a demonstration of the significance of this criteria, benzene triisocyanate and toluene triisocyanate were synthesized and tested in typical propellant formulations with poly(difluoramino ether) alcohols of the type described above. Neither of these triisocyanates was appreciably soluble in the polyether and neither gave a formulation of acceptable physical properties.

The suitable polyisocyanates containing at least 3 —NCO groups thus far found most suitable for the crosslinking of the $NF_2$-containing polyether alcohols are those containing interlinked benzene rings containing isocyanate substituent groups, and these are represented by the following general formula:

$$R''(NCO)_n$$

wherein $n$ is an integer of at least 3. The triisocyanates may contain aliphatic hydrocarbon groups, cyclic hydrocarbon groups, interconnected aliphatic and cyclic hydrocarbon groups represented by the general formula as $R''$ and may also contain $NF_2$ substituents, as indicated.

CURING OF $NF_2$-POLYETHER ALCOHOLS WITH TRIISOCYANATES

The $NF_2$-containing polyether alcohols can be formed by various routes, e.g. addition reaction of $N_2F_4$ with an unsaturated alcohol or polymerization of an alkylene oxide containing $NF_2$. It is preferred to form an $NF_2$-containing prepolymer oil by polymerizing the $NF_2$-containing alkylene oxide monomer in the presence of a polyol, such as trimethylolpropane, $CH_3CH_2C(CH_2OH)_3$, which acts as an initiator and modifier of the polymer, especially beneficially modifying the polymer by increasing the number of OH groups per polymer molecule. The hydroxyl-containing modifiers tend to lower the molecular weight of the polymer, but increase the number of hydroxyl groups per polymer molecule.

In using $H_2O$ as the modifier, the water may be considered as adding to an alkylene oxide monomer to form a dihydric alcohol or diol initiator for intermolecular addition reaction with the other alkylene oxide monomers.

The polymerization reaction of the $NF_2$-substituted alkylene oxides or ether units in the presence of a diol or polyol is represented by the following equation:

$$(HO)_p \cdot R' \cdot OH + xR(NF_2)_m : O \rightarrow$$
$$(HO)_p \cdot R' \cdot O[\cdot R(NF_2)_m O \cdot]_x H$$

wherein, as in a diol such as ethylene glycol, R' represents the ethylene radical, $p$ is one, R represents the alkylene radical having $NF_2$ groups attached to certain of the carbon atoms, as in 4,5-bis($NF_2$) pentene-1 oxide where $m$ equals 2 and $x$ indicates the number of the alkylene oxide units, e.g. 4 to 80, interlinked in the polymer molecule. In this illustrative equation, 1 mole of the diol or polyol modifier is reacted with several molecules of the $NF_2$-substituted alkylene oxide monomer in an equivalent stoichiometric proportion to provide the 2 terminal OH groups. When the polyol reactant is the polyol trimethylolpropane, $p$ is 2 and R' has 6 carbon atoms.

The curing of the resulting modified polyether alcohol by a triisocyanate is represented by the following equation:

$$R''(NCO)_3 + HO \cdot R' \cdot O[\cdot R(NF_2)_m O \cdot]_x H \rightarrow$$
triisocyanate    poly($NF_2$—alkylene oxide)
$$(\cdot OOC \cdot HN \cdot)_2 R'' \cdot NH \cdot COO \cdot R' \cdot O[\cdot R(NF_2)_m O \cdot]_x H$$
crosslinked polyurethane unit In the foregoing equation, the modified polyether containing $x$ number of $NF_2$-alkylene oxide or ether monomeric units is linked through a urethane linkage to the reacted triisocyanate crosslinking agent. It is to be noted that the reacted triisocyanate molecule has 2 additional urethane functional groups formed by linking to other polyether molecules through reaction with the OH functions of these molecules. The urethane functional group may be written

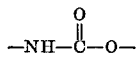

In this equation, 1 molecule of the triisocyanate is used for crosslinking 3 of the polyether alcohol molecules.

The crosslinking of the polyether alcohols containing $NF_2$ groups with the triisocyanates provides a desired single-step curing reaction. This is advantageous for carrying out the loading or compositing of the polymer with liquid and solid oxidizers and with fuel compoents, then curing with a minimum of handling. The single-step cure is also inherently much safer as it eliminates much handling of these hazardous materials required by conventional curing techniques.

The variously modified polyethers have been found to cure to tough elastomers at room temperature when catalyzed with catalysts such as stannous octoate. Loading experiments have been performed with high-energy fluorine oxidizers, such as tetrakis($NF_2$) butane and tetrakis ($NF_2$) furan and hexakis($NF_2$) dipropyl ether, and with oxygen oxidizers, such as ammonium perchlorate and hydrazinium mono and diperchlorate. Without a curing catalyst, more time is required for the curing.

A model formulation, which has been cast in test bars and cured under a variety of conditions for physical testing, is described in the following example.

EXAMPLE 1

Formulation 20 wt. percent glycidol-modified PPMOA, (10 mole percent glycidol)
20 wt. percent tetrakis($NF_2$) butane,
60 wt. percent ammonium perchlorate,
polymethylene polyphenyltriisocyanate equivalent to PPMOA.

The ingredients listed were mixed together and cured under conditions shown in the following table:

TABLE I.—PROPERTIES OF TRIISOCYANATE-CURED FORMULATIONS

| Property | Curing schedule, 92 hours at room temperature plus— | | | | |
|---|---|---|---|---|---|
| | 72 hrs. at room temperature | 0 hrs. at 55° C. | 1 hr. at 55° C. | 2 hrs. at 55° C. | 3 hrs. at 55° C |
| Tensile, p.s.i. | 61 | 48 | 59 | 53 | 59 |
| Elongation, percent | 10 | 8 | 10 | 8 | 16 |
| Impact, kg. in | 20 | | | | 20 |

In the formulations, the calculated $NF_2$ content is as follows:

|  | Percent |
|---|---|
| On binder (polyether plus triisocyanate) | 42.3 |
| On binder plus tetrakis($NF_2$) butane | 59.2 |
| On total mixture | 25 |

Based on the curing tests made, curing was essentially complete in 72 hours at room temperature or after 1 hour at 55° C. The sample bars were of excellent appearance and were adequately rubbery for obtaining tensile and elongation values which are acceptable, and which indicated that satisfactory solid propellant grains could be made, as confirmed by additional tests.

The progress of the single-step triisocyanate cure was followed by infrared spectroscopy to find that the system was highly reactive, as shown by the complete disappearance of the hydroxyl peak within one hour at room temperature and a steady diminution of the NCO peak in about 4½ hours at room temperature.

From the preliminary experiments, it was determined that the $NF_2$-polyether alcohols cured with triisocyanates can form rubbery binders, either with or without loading, and that liquid $NF_2$-containing oxidizer loadings may actually improve the rubbery qualities of the cured elastomers, e.g. as in the use of 50 wt. percent tetrakis($NF_2$) furan based on the binder in the composite. Catalysis aids in obtaining low temperature cures. The triisocyanates which are more reactive and suitable as curing agents are those which are more soluble in the prepolymer that is to be cured. There are some differences in the susceptibility of the modified polyethers to curing, depending on the modifying agent. The soluble triisocyanates are more suitable. Cured samples obtained have glossy surfaces, are translucent, homogeneous in appearance, and showed no signs of exudation or other failure to contain liquid loadings. High solid loadings with as much as 400% solid oxidizer yield hard masses with surprising tensile strength.

Curing of the $NF_2$-polyether alcohol, PPMOA, modified by trimethylolpropane was very successful in yielding a crosslinked polyether having a tensile strength of 4000 p.s.i. at room temperature cures and maximum tensile strengths of 7000 p.s.i. at higher temperature cures ranging up to about 82° C. using upon to 150% of the stiochiometric amount of triisocyanate, triphenyl methane triisocyanate.

In an optimum curing test, 1.54 equivalents of triphenyl methane triisocyanate was used with 0.5% stannous octoate as catalyst. The curing was carried out for 4 days at room temperature, and then for an additional 22½ hours at 52° C., and additional 22½ hours at 72° C. and an additional 22½ hours at 82° C. Between these periods of curing at increased temperatures, samples were tested and it was found that the tensile strength increased from 3580 p.s.i. for the room temperature curing up to 6900 p.s.i. following curing at 72° C. and 82° C. The elongation was in the range of 20 to 16%, decreasing as the tensile strength increased.

The organic triisocyanates useful for the curing are highly reactive and care has to be taken to prevent reaction before they are used in the curing. Triphenyl methane triisocyanate is kept in 25% $CH_2Cl_2$ solution and loses curing activity if not kept in solution. The triisocyanate is stripped free of the $CH_2Cl_2$ solvent just before it is used for the crosslinking.

As the triisocyanates give such high tensile strengths, more than necessary, they can be used with diisocyanates to obtain crosslinked binders which meet tensile strength requirements.

EXAMPLE 2

A trimethylolpropane-modified PPMOA polymer containing 50% $NF_2$ was crosslinked with 1.3 equivalents of butane diisocyanate-$NF_2$ adduct and triphenyl methane triisocyanate, using 0.5% stannous octoate catalyst, and curing the mixture 5 days at room temperature, and then 22½ hours at 52° C. By replacing 25% of the triisocyanate with the diisocyanate, the crosslinked binder formed had an acceptable tensile strength of 560 p.s.i. Increasing the proportion of the diisocyanate to the triisocyanate tends to lower the tensile strength of the binder product, alhough there is a gain in $NF_2$ content of the product. With 0.75% equivalent of the diisocyanate and 0.25% equivalent of the triisocyanate in the crosslinking, the tensile strength dropped to 50 p.s.i. which is unacceptable for formulation with liquid $NF_2$ and solid oxygen oxidizers.

Composite formulations

The di and triisocyanate-cured polyether alcohols were used in formulations with various solid oxygen oxidizers and liquid fluorine oxidizers to determine the effects of loading by these oxidizers on tensile strength. The composites may also contain fuel components, such as a powdered metal, i.e. aluminum, beryllium, boron, lithium or hydrides of the metal.

The oxygen oxidizers are represented by compounds such as ammonium perchlorate, hydrazine perchlorate, hydrazine diperchlorate, encapsulated nitronium perchlorate, hydrazine nitroformate, hexanitroethane and others.

The liquid oxidizers containing $NF_2$ are represented by tetrakis($NF_2$) butane, tetrakis($NF_2$) furan, hexakis($NF_2$) propyl ether, and various other $NF_2$-substituted alkanes, dialkyl ethers and epoxy alkanes having 2 to 10 carbon atoms per molecule and an $NF_2$ group linked to each carbon atom. Such liquid oxidizers are compatible or miscible with the triisocyanates and aid the curing.

To obtain propellants of high $I_{sp}$ (specific impulse) values, preferably above 270, in general the proportion of the binder in the composite should be limited to about 5 to 30 wt. percent, the metal-containing fuel to about 1 to 10 wt. percent, the solid oxygen oxidizer from 10 to 60 wt. percent, and the liquid $NF_2$-containing oxidizer from about 20 to 70 wt. percent.

EXAMPLE 3

Formulation with ammonium perchlorate

To determine whether the presence of a solid oxidizer interferes with or beneficially modifies the curing of a polyurethane binder formed by crosslinking a polyether alcohol containing $NF_2$ groups, the polyether alcohols were mixed with ammonium perchlorate of 65 micron size, and both diisocyanate and triisocyanate crosslinking agents were used. Comparative curing conditions of 5 days at room temperature and 0.5% of catalyst were used in making the test. In the test formulations, as much as 80% of ammonium perchlorate with 20% of binder were used. One equivalent of the triisocyanate gave the same tensile strength as two equivalents of the diisocyanate to the cured loaded composite, i.e. a tensile strength in the range of 630 to 680 p.s.i.

EXAMPLE 4

Formulation with ammonium perchlorate and tetrakis($NF_2$) butane

The effects of both the solid oxygen oxidizer, ammonium perchlorate, and of the liquid oxidizer, tetrakis-($NF_2$) butane, on the curing characteristics of the polyurethane resulting from the crosslinking of the polyether alcohol containing $NF_2$ groups, PPMOA, were determined by testing formulations containing the following components:

| | Percent |
|---|---|
| polymer and crosslinking agent | 25 |
| tetrakis($NF_2$) butane | 35 |
| ammonium perchlorate | 40 |

Such a formation represents a high ratio of the liquid $NF_2$-containing oxidizer to binder. In curing this formulation with triphenyl methane triisocyanate, encouraging results were obtained. With a 50% excess of the triisocyanate based on hydroxyl equivalents of the polyether alcohol, the cured composite was found to have tensile strengths above the minimum of 50 p.s.i. This could not be obtained with a diisocyanate cure using 2 equivalents of bis($NF_2$) butane diisocyanate and 1 equivalent of trimethylolpropane and using comparable curing conditions of 7 days at room temperature. Instead, a material with a muddy consistency and no measurable strength resulted with the liquid oxidizer exuding from the propellant.

EXAMPLE 5

Formulation with hydrazine diperchlorate and tetrakis($NF_2$) butane

Formulations with hydrazine diperchlorate, $N_2H_4$·$(2HClO_4)$, gave unexpectedly higher tensile strength than obtained with ammonium perchlorate.

Formulation

25% polyether alcohol, PPMOA trimethylolpropane (TMP) modified
35% tetrakis($NF_2$) butane $CH_2(NF_2)CH(NF_2)CH(NF_2)CH_2(NF_2)$
40% hydrazine diperchlorate $N_2H_4(HClO_4)_2$ Using the same curing conditions as in Example 4, it was found that the triisocyanate (triphenyl methane triisocyanate) in 54% excess gave the cured composite a tensile strength of 235 p.s.i., as compared to 70 p.s.i. when ammonium perchlorate was used instead of the hydrazine diperchlorate. This increased tensile strength with hydrazine diperchlorate is indicated to result from a reaction of the triisocyanate with the hydrazine diperchlorate, involving the reactive hydrogen of the hydrazine and the trifunctionality of the triisocyanate. The reinforcing action evidently results from this reaction.

Other interesting observations were made of the fact that the liquid fluorine oxidizer, tetrakis($NF_2$) butane, could be increased in proportion from 35 to 50 wt. percent and higher, keeping the tensile strength of the cured composite within acceptable tensile strength limits. Within certain limits, the decrease in tensile strength by increase of the liquid oxidizer can be compensated for by increase of the triisocyanate.

The data in the following Table II illustrate that the triphenyl methane triisocyanate (TTI) gives an unexpectedly high tensile strength cure with an optimum of about 1.5 equivalents of NCO to OH functions in the polyether-$NF_2$ adduct.

TABLE II.—BINDER FORMULATION

| TTI equivalents | Number of crosslinks PPMOA-TMP molecule | Curing schedule | Tensile strength, p.s.i |
|---|---|---|---|
| 1.32 | 0.88 | 55 days at room temperature | 3,140 |
| | 0.88 | plus 22½ hours at 52° C | 3,780 |
| | 0.88 | plus 22½ hours at 72° C | 5,430 |
| 1.54 | 1.03 | 5 days at room temperature | 3,580 |
| | 1.03 | plus 22½ hours at 52° C | 5,100 |
| | 1.03 | plus 22½ hours at 72° C | 6,900 |
| | 1.03 | plus 22½ hours at 82° C | 6,900 |
| 1.76 | 1.17 | 5 days at room temperature | 3,300 |
| | 1.17 | plus 22½ hours at 52° C | 4,300 |
| | 1.17 | plus 22½ hours at 72° C | 6,600 |
| | 1.17 | plus 22½ hours at 82° C | 6,600 |

The data in the following Table III on formulations of the $NF_2$-polyether with TTI triisocyanate crosslinking permitted the use of high loading with the solid oxygen oxidizer and permitted the use of 25 to 35% of the liquid $NF_2$-containing oxidizer.

TABLE III

[Formulation: As indicated under Example 5, unless otherwise stated. Curing conditions: 7 days at room temperature.]

| Triisocyanate TTI equivalents | Number of crosslinks PPMOA-TMP molecule | Tensile strength, p.s.i. | Percent elongation |
|---|---|---|---|
| 0.93 | 0.62 | 25 | 65 |
| 1.10 | 0.73 | 75 | 35 |
| 1.30 | 0.87 | 180 | 35 |
| 1.54 | 1.03 | 235 | 30 |
| 1.30 [1] | 0.87 | 240 | 40 |

[1] Formulation consisting of 25% binder, 25% tetrakis ($NF_2$) butane and 50% hydrazine diperchlorate.

It will be noted that when the liquid $NF_2$-containing organic oxidizer is increased, the tensile strength tends to be lowered but that this can be compensated for by an increase of the triisocyanate.

From a number of tests, it has been found that there is a linear relationship of the tensile strength to the ratio of the liquid $NF_2$-containing oxidizer to the binder. For example, when the ratio of the liquid to the binder is about 1.4, the tensile strength is of the order of 235 p.s.i., and when the ratio of the liquid to the binder is about 3.8, the tensile strength is about 50 p.s.i. The liquid NF$_2$-containing oxidizer may be an NF$_2$-substituted dialkyl ether, such as hexakis(NF$_2$) dipropyl ether, which is less volatile than the tetrakis(NF$_2$) butane. Formulations were made with this NF$_2$-containing ether used in a proportion of about 40 wt. percent with 20 wt. percent of the binder and 40 wt. percent of hydrazine diperchlorate. The curing of the binder was made with the triisocyanate (TTI) at room temperature for 7 days using 1.5 equivalents of the TTI, and the resulting cured composition was found to have a tensile strength of 105 p.s.i. and an elongation of 30%.

The invention described is claimed as follows:

1. A solid rubbery high-energy polyurethane of poly(difluoroamino ether) alcohol crosslinked by an organic triisocyanate which forms urethane links

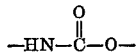

in replacement of hydroxyl groups in the poly(difluoramino ether) alcohol.

2. A solid rubbery high-energy polyurethane characterized by recurring poly(difluoramino ether) units [·R(NF$_2$)$_m$O·] which contain an NF$_2$ group attached to each of an $m$ number of 2 to 4 carbon atoms in an alkylene radical R of 4 to 6 carbon atoms, said units being in a crosslinked polyurethane unit represented by:

wherein $x$ is a number of about 4 to 80, R is the hydrocarbon radical of a polyol, R' is the hydrocarbon radical of a polyhydric polymer modifier, and R'' is the hydrocarbon radical of a polyisocyanate that forms at least 3 urethane functions.

3. The polyurethane defined in claim 2 wherein the polyol is trimethylolpropane, and the polyisocyanate is triphenyl methane triisocyanate.

4. The polyurethane defined in claim 2 wherein the polyisocyanate is polymethylene polyphenyltriisocyanate.

5. A solid rubbery high-energy polyurethane as defined in claim 2 wherein the polyurethane is plasticized by a liquid organic oxidizer having an NF$_2$ group linked to each carbon atom.

6. A solid rubbery high-energy polyurethane as defined in claim 2 wherein the polyurethane is cured in combination with hydrazine diperchlorate.

7. A solid rubbery high-energy polyurethane of a poly(difluoramino ether) alcohol which has the recurring units of 4,5-bis(NF$_2$) pentene-1 oxide crosslinked by triphenyl methane triisocyanate of which —NCO functions form urethane links

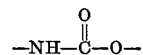

that replace hydroxyl groups of the poly(difluoramino ether) alcohol.

8. Process for preparing a high-energy polyurethane which comprises reacting a poly(difluoramino ether) alcohol with a compatible organic polyisocyanate compound containing 3 —NCO groups per molecule to replace hydroxyl groups with urethane links

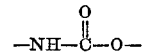

9. Process as in claim 8 in which the organic crosslinking compound is selected from the group consisting of polymethylene polyphenyltriisocyanate, triphenyl methane triisocyanate, poly(methylene phenylene diisocyanate) and poly(toluene diisocyanate).

10. Process as in claim 8 in which the poly(difluoramino ether) alcohol is reacted with the polyisocyanate solubilized in a liquid organic compound of the class consisting of NF$_2$-substituted alkanes, dialkyl ethers, and epoxy alkanes which contain 2 to 10 carbon atoms per molecule and an NF$_2$ group linked to each carbon atom.

11. Process as defined in claim 8 in which the polyisocyanate is reacted in a proportion of about 50% excess of the amount to convert hydroxyl groups of the poly(difluoramino ether) alcohol to urethane links.

12. Process of preparing a cured high-energy polyurethane which comprises reacting a poly(difluoramino ether) alcohol with a compatible organic triisocyanate that crosslinks through formation of urethane functions replacing hydroxyl groups of the alcohol and with hydrazine diperchlorate.

References Cited

UNITED STATES PATENTS

| | | | |
|---|---|---|---|
| 3,520,743 | 7/1970 | King | 149—19 |
| 3,361,689 | 2/1968 | Miegel et al. | 149—19 X |
| 3,390,136 | 6/1968 | Leary et al. | 149—19 X |

BENJAMIN R. PADGETT, Primary Examiner

U.S. Cl. X.R.

149—36, 75; 260—77.5 AQ, 77.5 AT